(12) United States Patent
Hoppe

(10) Patent No.: US 12,399,054 B1
(45) Date of Patent: Aug. 26, 2025

(54) CLAMP ON ULTRASONIC FLOW METER

(71) Applicant: Norgas Metering Technologies, Inc., Fairfield, OH (US)

(72) Inventor: Gene Anthony Hoppe, Cincinnati, OH (US)

(73) Assignee: Sunsonic, LLC, Venice, FL (US)

( * ) Notice: Subject to any disclaimer, the term of this patent is extended or adjusted under 35 U.S.C. 154(b) by 316 days.

(21) Appl. No.: 18/055,087

(22) Filed: Nov. 14, 2022

(51) Int. Cl.
*G01F 23/2962* (2022.01)
*G01F 1/66* (2022.01)

(52) U.S. Cl.
CPC .......... *G01F 23/2962* (2013.01); *G01F 1/662* (2013.01)

(58) Field of Classification Search
CPC .................................................. G01F 23/2962
See application file for complete search history.

(56) References Cited

U.S. PATENT DOCUMENTS

| | | |
|---|---|---|
| D23,917 S | 12/1894 | Lane |
| 1,029,775 A | 6/1912 | Tobin |
| D57,407 S | 3/1921 | Walker |
| D100,139 S | 6/1936 | Weld |
| 2,120,577 A | 6/1938 | Schulte |
| D134,789 S | 1/1943 | Gade |
| 2,552,794 A | 5/1951 | Kimbell |
| 2,727,551 A | 12/1955 | Rees |
| D198,713 S | 7/1964 | Curtiss |
| D200,549 S | 3/1965 | Nunn |
| 3,241,800 A | 3/1966 | Richter, III |
| D218,674 S | 9/1970 | Ernest |
| 3,539,138 A | 11/1970 | Desroches |
| D220,027 S | 3/1971 | Myers |
| D223,187 S | 3/1972 | Wing |
| 3,702,628 A | 11/1972 | Cosenza |
| D231,585 S | 5/1974 | Yoshimura |
| D233,652 S | 11/1974 | Wing |
| 4,019,550 A | 4/1977 | DeHaitre |
| D244,908 S | 7/1977 | Hatter et al. |
| D244,909 S | 7/1977 | Gill |
| D265,189 S | 6/1982 | Eriksson et al. |
| D273,561 S | 4/1984 | Ozaki et al. |
| D275,843 S | 10/1984 | Sharenow |
| D281,953 S | 12/1985 | Newman |
| 4,844,396 A | 7/1989 | Norton |
| D311,131 S | 10/1990 | Saito |
| 5,098,054 A | 3/1992 | Dyer |
| 5,344,112 A | 9/1994 | Peterson et al. |
| D364,882 S | 12/1995 | Junkers |

(Continued)

*Primary Examiner* — Kristina M Deherrera
*Assistant Examiner* — Jean F Morello
(74) *Attorney, Agent, or Firm* — Wood Herron & Evans LLP

(57) ABSTRACT

A clamp-on ultrasonic meter includes a housing with first and second portions which define an aperture for receiving a pipe, which include an ultrasonic transmitter and receiver that engage the pipe. The first and second portions are hingedly connected and clamped to one another around the pipe using an overcenter latch mechanism that incorporates a hinge with first and second ends each comprising a bearing, with the bearing in the first end of the hinge coupled to an axle on the housing and the bearing in the second end coupled to an axle on the latch. The latch couples to and engages a hook on the second housing portion, engaging the pipe within the aperture in compression pressure produced by the latch.

8 Claims, 6 Drawing Sheets

(56) References Cited

U.S. PATENT DOCUMENTS

| | | |
|---|---|---|
| 5,484,253 A | 1/1996 | Johnson |
| D388,933 S | 1/1998 | Hunter et al. |
| 5,769,375 A | 6/1998 | Welker |
| 5,814,737 A | 9/1998 | Brown |
| 6,062,091 A | 5/2000 | Baumoel |
| 6,071,052 A | 6/2000 | Kerr |
| 6,089,104 A | 7/2000 | Chang |
| 6,158,288 A | 12/2000 | Smith |
| 6,216,544 B1 | 4/2001 | Adachi et al. |
| D446,111 S | 8/2001 | Hussaini |
| D453,478 S | 2/2002 | Ishii |
| 6,345,538 B1 | 2/2002 | Krahbichler et al. |
| D459,207 S | 6/2002 | Miyata |
| 6,532,827 B1 | 3/2003 | Ohnishi |
| 6,604,433 B1 | 8/2003 | Azuma et al. |
| 6,615,674 B2 | 9/2003 | Ohnishi |
| 6,715,366 B2 | 4/2004 | Ohnishi |
| 6,739,203 B1 | 5/2004 | Feldman et al. |
| 6,745,632 B1 | 6/2004 | Dryer et al. |
| 6,748,811 B1 | 6/2004 | Iwanaga et al. |
| D492,612 S | 7/2004 | Huang |
| 6,772,643 B2 | 8/2004 | Eguchi et al. |
| 6,776,051 B2 | 8/2004 | Suzuki et al. |
| 6,883,386 B2 | 4/2005 | Osone et al. |
| 6,907,361 B2 | 6/2005 | Molenaar et al. |
| 6,925,891 B2 | 8/2005 | Suginouchi et al. |
| 6,931,944 B2 | 8/2005 | Wiest et al. |
| 6,931,945 B2 | 8/2005 | Takeda et al. |
| 6,964,400 B2 | 11/2005 | Lu |
| D519,076 S | 4/2006 | Fox |
| 7,032,461 B2 | 4/2006 | Ueki et al. |
| 7,063,565 B2 | 6/2006 | Ward |
| 7,073,395 B2 | 7/2006 | Suginouchi et al. |
| 7,082,841 B2 | 8/2006 | Umekage et al. |
| 7,096,135 B2 | 8/2006 | Ao et al. |
| D532,684 S | 11/2006 | Barnes |
| 7,152,490 B1 | 12/2006 | Freund, Jr. et al. |
| D535,259 S | 1/2007 | Rodrigues et al. |
| D539,129 S | 3/2007 | Griffiths |
| D551,972 S | 10/2007 | Jacobs et al. |
| 7,318,355 B2 | 1/2008 | Ishikawa |
| 7,360,449 B2 | 4/2008 | Umekage et al. |
| 7,380,469 B2 | 6/2008 | Molenaar et al. |
| 7,380,470 B2 | 6/2008 | Konzelmann et al. |
| 7,412,902 B2 | 8/2008 | Wiest et al. |
| D581,777 S | 12/2008 | Huang |
| 7,523,676 B2 | 4/2009 | Li et al. |
| 7,571,656 B2 | 8/2009 | Derevyagin et al. |
| 7,581,453 B2 | 9/2009 | Ao et al. |
| D601,507 S | 10/2009 | Rodrigues |
| 7,607,359 B2 | 10/2009 | Hecht et al. |
| 7,614,309 B2 | 11/2009 | Rieder et al. |
| 7,624,651 B2 | 12/2009 | Fernald et al. |
| 7,637,171 B2 | 12/2009 | Zhang et al. |
| 7,658,114 B1 | 2/2010 | Sui et al. |
| 7,673,526 B2 | 3/2010 | Bailey et al. |
| 7,706,986 B2 | 4/2010 | Frohlich et al. |
| D616,777 S | 6/2010 | Jackson |
| 7,775,125 B2 | 8/2010 | Rhodes |
| 7,806,003 B2 | 10/2010 | Ohmuro et al. |
| 7,832,282 B2 | 11/2010 | Ao |
| 7,963,176 B2 | 6/2011 | Pors et al. |
| 7,980,142 B2 | 7/2011 | Nakabayashi et al. |
| 8,007,216 B2 | 8/2011 | Ross et al. |
| D644,673 S | 9/2011 | Drenth et al. |
| 8,047,081 B2 | 11/2011 | Berberig et al. |
| 8,104,359 B2 | 1/2012 | Wiest et al. |
| 8,161,824 B2 | 4/2012 | Satou et al. |
| 8,186,229 B2 | 5/2012 | Allen |
| 8,210,783 B2 | 7/2012 | Morrison |
| 8,402,840 B2 | 3/2013 | Gysling et al. |
| D679,988 S | 4/2013 | Yamazaki |
| 8,548,755 B2 | 10/2013 | Takemura et al. |
| 8,613,226 B2 | 12/2013 | Sugiura et al. |
| D703,521 S | 4/2014 | Haynes et al. |
| D705,102 S | 5/2014 | McDonald et al. |
| 8,714,030 B1 | 5/2014 | Liu et al. |
| D718,165 S | 11/2014 | Dick |
| 8,919,207 B2 | 12/2014 | Sui et al. |
| 9,032,816 B2 | 5/2015 | Satou et al. |
| D742,721 S | 11/2015 | Cosby et al. |
| 9,492,901 B2 | 11/2016 | Peltz et al. |
| D785,478 S | 5/2017 | Hänninen |
| 9,714,858 B2 | 7/2017 | Laursen et al. |
| D802,407 S | 11/2017 | Foerster, Jr. |
| D802,410 S | 11/2017 | Felix |
| D809,376 S | 2/2018 | Huang |
| D816,034 S | 4/2018 | Mascher |
| D832,123 S | 10/2018 | Nakai et al. |
| D845,804 S | 4/2019 | Williams et al. |
| 10,281,437 B2 | 5/2019 | Leaders et al. |
| D851,524 S | 6/2019 | Dick |
| 10,337,551 B2 | 7/2019 | Foerster, Jr. |
| 10,809,106 B2 | 10/2020 | Stuyvenberg et al. |
| 10,904,644 B2 | 1/2021 | White et al. |
| D925,345 S | 7/2021 | Slocum et al. |
| D932,291 S | 10/2021 | Grøndal |
| D942,845 S | 2/2022 | Iacono |
| D959,257 S | 8/2022 | Dick |
| D995,339 S | 8/2023 | Hoppe |
| 2002/0104385 A1 | 8/2002 | Imai et al. |
| 2003/0039527 A1 | 2/2003 | Schatz |
| 2003/0219325 A1 | 11/2003 | Schultz |
| 2004/0136807 A1 | 7/2004 | Foerster, Jr. |
| 2005/0011280 A1 | 1/2005 | Imai et al. |
| 2005/0136735 A1 | 6/2005 | Rodrigues et al. |
| 2006/0013671 A1 | 1/2006 | Lauderbaugh |
| 2006/0156828 A1 | 7/2006 | Konzelmann et al. |
| 2008/0307911 A1 | 12/2008 | Allen |
| 2009/0255089 A1* | 10/2009 | Boonmatun ............ E05C 19/14 |
| | | 70/2 |
| 2011/0162462 A1 | 7/2011 | Allen |
| 2011/0162463 A1 | 7/2011 | Allen |
| 2011/0233377 A1 | 9/2011 | Luo et al. |
| 2011/0314932 A1 | 12/2011 | Straub, Jr. et al. |
| 2012/0247225 A1 | 10/2012 | Allen |
| 2012/0318069 A1* | 12/2012 | Murakami ............ G01F 1/667 |
| | | 73/861.18 |
| 2013/0180341 A1* | 7/2013 | Murakami ............ G01F 1/662 |
| | | 73/861.18 |
| 2013/0294475 A1 | 11/2013 | Derr et al. |
| 2013/0327155 A1 | 12/2013 | Drachmann |
| 2015/0268077 A1 | 9/2015 | Mezheritsky et al. |
| 2016/0116316 A1 | 4/2016 | Kissling et al. |
| 2016/0116317 A1 | 4/2016 | Zhang et al. |
| 2017/0030749 A1 | 2/2017 | Joshi et al. |
| 2017/0122359 A1 | 5/2017 | Foerster, Jr. |
| 2017/0160240 A1 | 6/2017 | Fan |
| 2017/0314979 A1 | 11/2017 | Ye et al. |
| 2020/0264021 A1 | 8/2020 | Stuyvenberg et al. |
| 2021/0048325 A1 | 2/2021 | Liu et al. |
| 2021/0116277 A1 | 4/2021 | Henzmann et al. |
| 2021/0148741 A1 | 5/2021 | Nielsen et al. |
| 2021/0207983 A1 | 7/2021 | Mikan |
| 2021/0223084 A1 | 7/2021 | Verma |
| 2021/0293593 A1 | 9/2021 | Takahashi et al. |
| 2022/0136880 A1 | 5/2022 | Pilegaard et al. |

* cited by examiner

CLAMP ON ULTRASONIC FLOW METER

BACKGROUND OF THE INVENTION

The present invention relates to ultrasonic flow meters, and more particularly to ultrasonic flow meters that may be clamped to a pipe for flow metering without plumbing modification.

Ultrasonic flow metering has become increasingly popular for measuring movement of fluids through pipes. Typically, an ultrasonic flow meter uses an ultrasonic transmitter and receiver, where the transmitter emits an ultrasonic pulse into piping carrying the fluid, where it is conveyed to and received by the ultrasonic receiver. Typically, the time of flight of the ultrasonic pulse is measured, and a change in that time of flight is indicative of the movement of the fluid medium within the piping.

Many ultrasonic meters are sold in combination with a section of piping that must be installed into the flow path of fluid, requiring the services of a professional installer such as a plumber, which can be expensive and time consuming. Other meters are sold with clamping structures that engage the meter to the exterior of existing piping to capture flow through the piping without any plumbing modification to the piping. Examples of the latter type of meter are shown in U.S. Pat. Nos. 7,963,176 and 8,402,840, which show an ultrasonic meter combined with a clamping mechanism, in the former patent the clamping mechanism involves a strap placed around the piping, and in the latter case the clamping mechanism is a clamshell structure which is bolted to the piping.

These and other known clamp-on ultrasonic flow meters have a relatively complicated clamping structure that requires time and expertise to install, and potentially specialized tools. As a result, these meters are not readily used in cost sensitive applications or applications involving tight quarters where professional services and elaborate installation procedures may be prohibitive. One such application is submetering of utility usage in apartment buildings, which is typically accomplished by retrofitting submetering equipment into existing utility spaces which can be cramped and difficult to access.

There is a need, therefore, for a clamp-on type ultrasonic flow meter that has a relatively easy to install clamping structure, that produces accurate metering for flow through a pipe without the need for plumbing modification or special tools, and which can be installed in a cramped or not easily accessible space.

SUMMARY OF THE INVENTION

The foregoing needs are met in accordance with principles of the present invention, which provide a clamp-on ultrasonic meter that uses an overcenter latch to clamp the meter to a section of piping in a relatively easy manner not requiring complicated steps, special tools or a large amount of available space.

In the disclosed particular embodiment, a clamp-on ultrasonic meter in accordance with the invention comprises a housing with first and second portions, defining an aperture for receiving a pipe for flow measurement. An ultrasonic transmitter and receiver are positioned in the housing adjacent to the aperture to engage the pipe placed in the aperture for ultrasonic metering. The first and second portions are hingedly connected and are clamped to one another around a pipe in the aperture using a latch and hinge mechanism. The hinge has first and second ends each comprising a bearing, with the bearing in the first end of the hinge coupled to a housing axle on the first housing portion, and the bearing in the second end of the hinge coupled to a latch axle on the latch. A hook on the latch couples to and engages a hook on the second housing portion, so that a pipe may be engaged within the aperture by closing said first and second housing portions about the pipe, coupling said latch hook to said housing hook and positioning said latch to compress the hinge between the latch axle and the housing axle and thereby provide closing pressure through the latch to compress said first and second housing portions about said pipe.

In the disclosed embodiment, the second housing portion comprises two housing hooks, and the latch comprises two latch hooks, so that a pipe may be engaged within said aperture by coupling both latch hooks to both housing hooks to provide a more stable latching of the housing portions about a pipe section.

In this disclosed embodiment, the first housing portion comprises two housing axle, the latch comprises two latch axle, and there are two hinges, so that the bearings at the first ends of the two hinges are coupled to the two housing axles, and the bearings at the second ends of the two hinges are coupled to the two latch axles to provide more stable latching of the housing portion about a pipe section.

In further aspects, the invention features methods of installing an ultrasonic meter using a hinged housing, latch, and hinges as described above.

DETAILED DESCRIPTION

Figure 1:
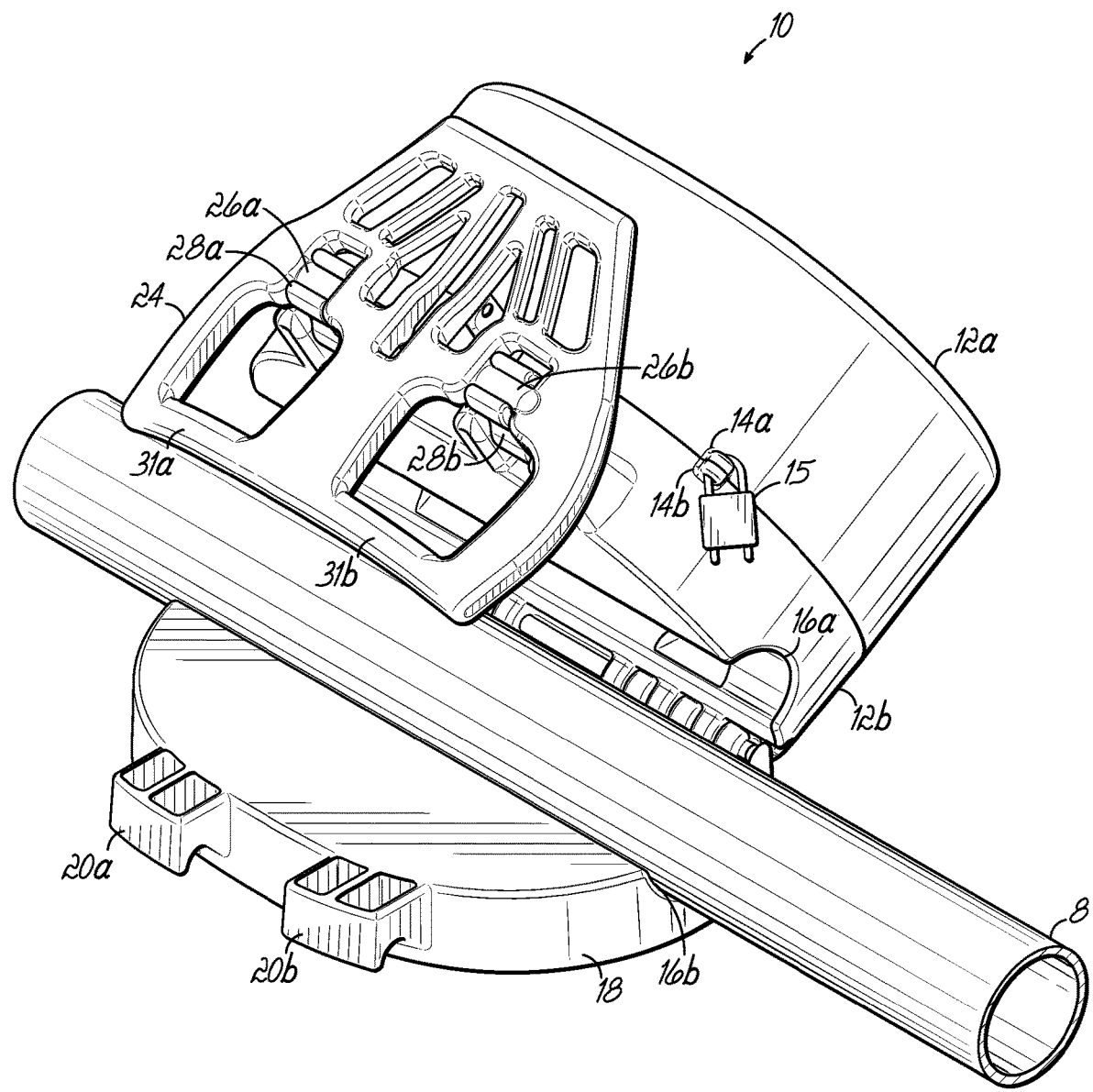
FIG. 1 is a front perspective view of a clamp on ultrasonic flow meter in accordance with principles of the present invention, in an open position preparing to clamp to a section of piping for flow measurement.

Referring now to the drawings, in which objects depicted in the several views are identified with the same reference number, FIG. 1 shows a front perspective view of a clamp-on ultrasonic flow meter for measuring flow through a section of piping 8, in accordance with principles of the present invention. The flow meter 10 comprises a housing in two portions, a first portion comprising section 12*a* and section 12*b*, which are mated together to form the first portion 12, and a second portion 18. First portion 12 and second portion 18 each respectively define a recess 16*a* and 16*b* which is sized to receive and clamp to the piping 8. The housing sections are connected via a hinge to allow movement between an open position seen in FIG. 1, and closed positions shown in the following FIGS.

FIG. 1 shows several components of the clamping mechanism that holds the first and second housing portions 12 and 18 together. Specifically, housing portion 12*a* defines two axles 30*a* and 30*b* (see FIG. 4, FIGS. 5A-5D) sized to respectively to two hinges 28*a* and 28*b*. Each hinge 28*a* and 28*b* has a dogbone cross section best seen in FIGS. 5A-5D, each end of which forms a bearing. The bearing on the first end of the hinges 28*a* and 28*b* snap fits to the housing axle 30*a* and 30*b*, allowing rotation of the hinges 28*a* and 28*b* about the axles 30*a* and 30*b*, respectively. The bearing on the second end of the hinges 28*a* and 28*b* snap fits to an axle 26*a* and 26*b* defined by a latch member 24. When the hinges 28*a* and 28*b* are connected to axles 30*a* and 30*b* and axles 26*a* and 26*b*, the latch may rotate within a controlled arc relative to the first housing portion.

Figure 5A:
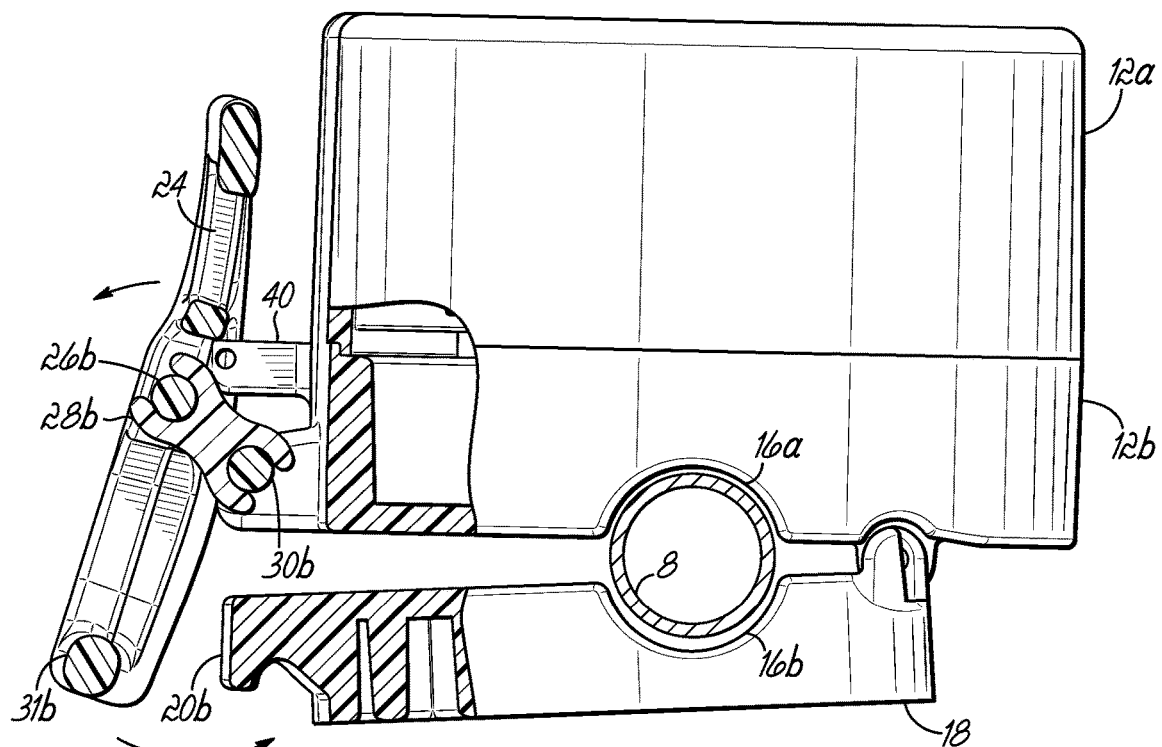
FIG. 5A is a left side view of the clamp on meter of FIGS. 1 and 2, shown in a partially open position and showing the movements of the exterior clamp used to clamp the meter to a section of piping.
Figure 5B:
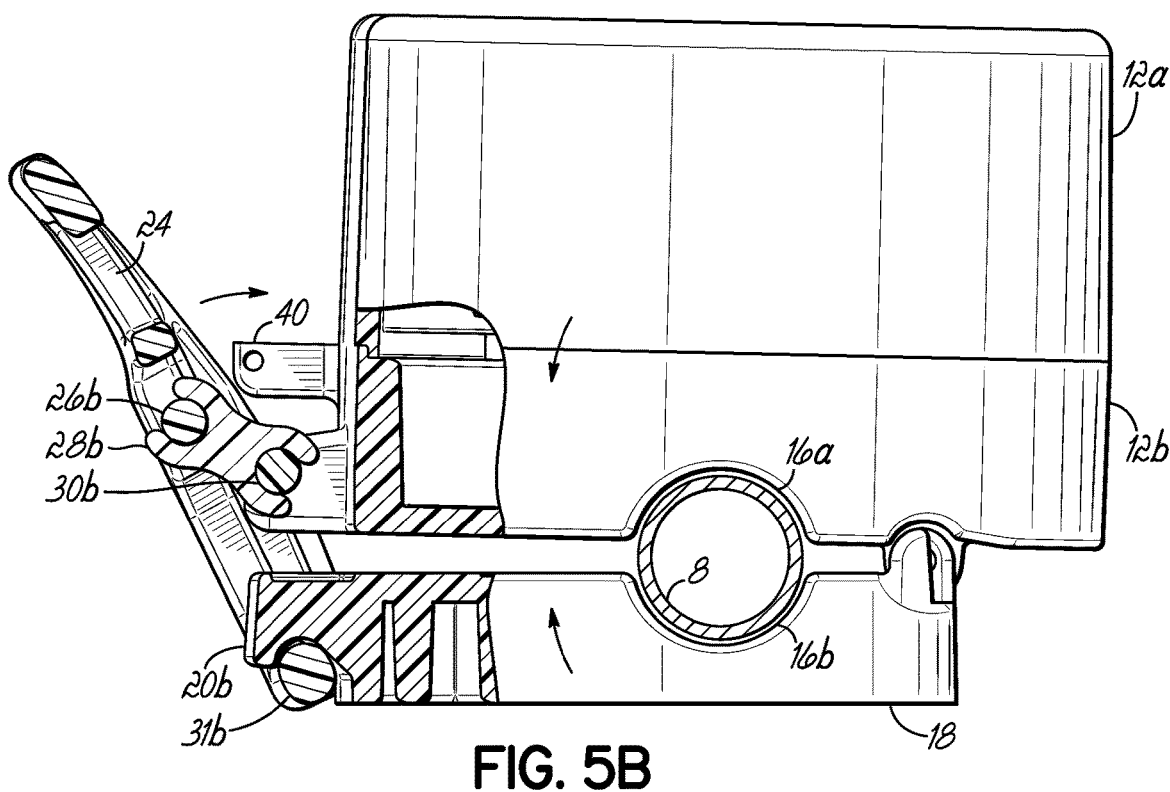
FIG. 5B is left side view of the clamp on meter of FIGS. 1 and 2, shown in a nearly closed position and showing the engagement of the exterior clamp to provide pressurized engagement to a section of piping.

FIG. 1 further illustrates the hook members 20*a* and 20*b* formed on the second portion of the housing. Hook members 20*a* and 20*b* are positioned to be engaged by hook members 31*a* and 31*b* defined in the latch member 24, as best seen in FIGS. 5A and 5B.

Figure 2:
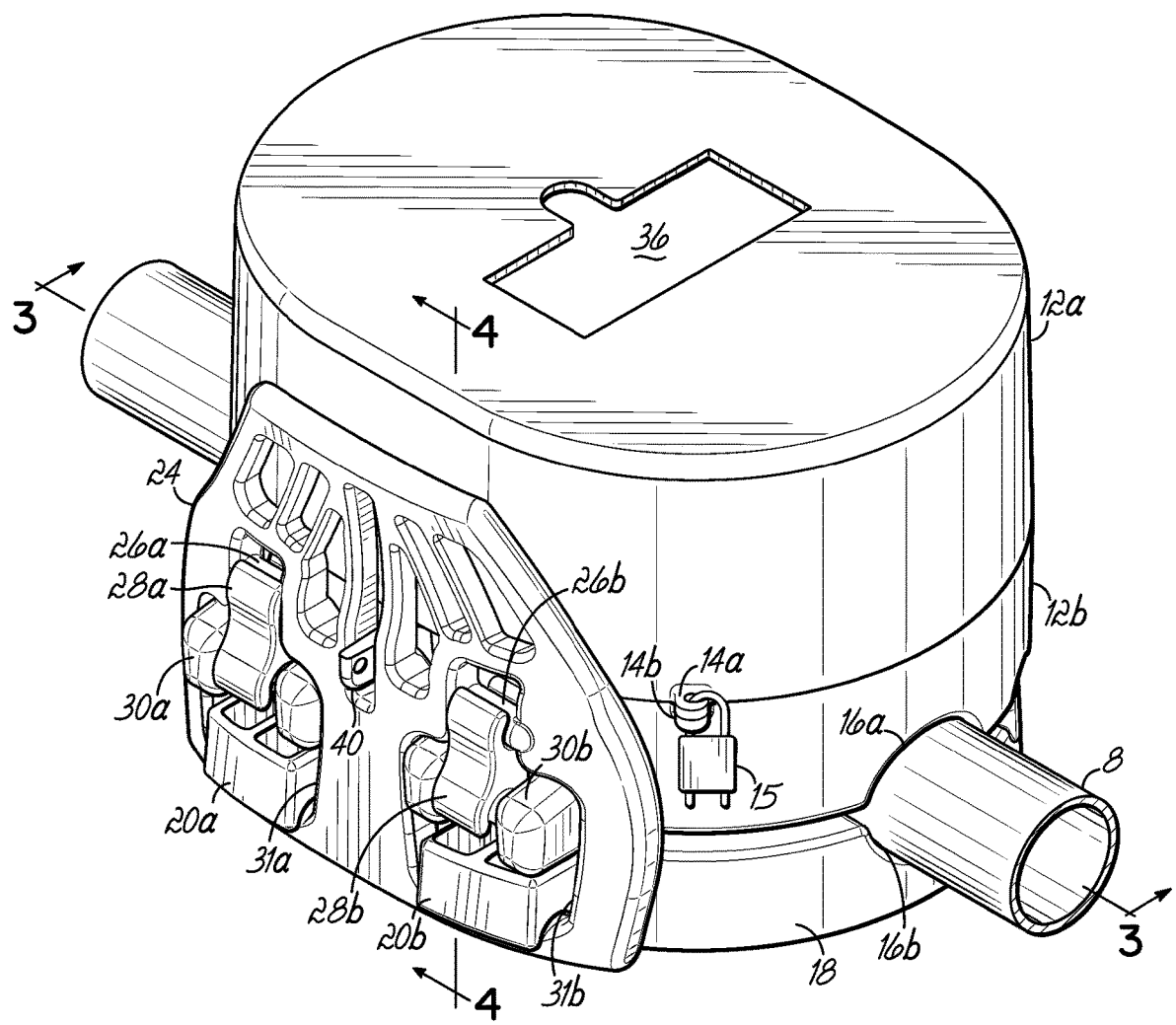
FIG. 2 is a front perspective view of the clamp on ultrasonic flow meter of FIG. 1, placed in a closed and clamped position on the section of piping.

FIG. 2 illustrates the flow sensor of FIG. 1 after latch member 24 has been fully engaged between the first and second housing portions and is providing force clamping the housing portions to pipe section 8.

FIGS. 1 and 2 also illustrate a tamper-evident device used on sections 12*a* and 12*b* of the first housing section. Loops 14*a* and 14*b* are positioned in registration on sections 12*a* and 12*b* so that once sections 12*a* and 12*b* of the first housing section are mated together, a tamper evident swaged fitting can be installed on loops 14*a* and 14*b* to provide evidence of tampering if a consumer seeks to open housing 12 by separating sections 12*a* and 12*b*.

A second tamper-evident device 40 is illustrated in FIG. 2. Loop 40 extends from housing section 12 through a hold defined in latch 24, so that a swaged tamper-evident device 42 (see FIG. 5D) can be installed on loop 40 to provide evidence that latch 24 has not be tampered with by a consumer.

Figure 3:
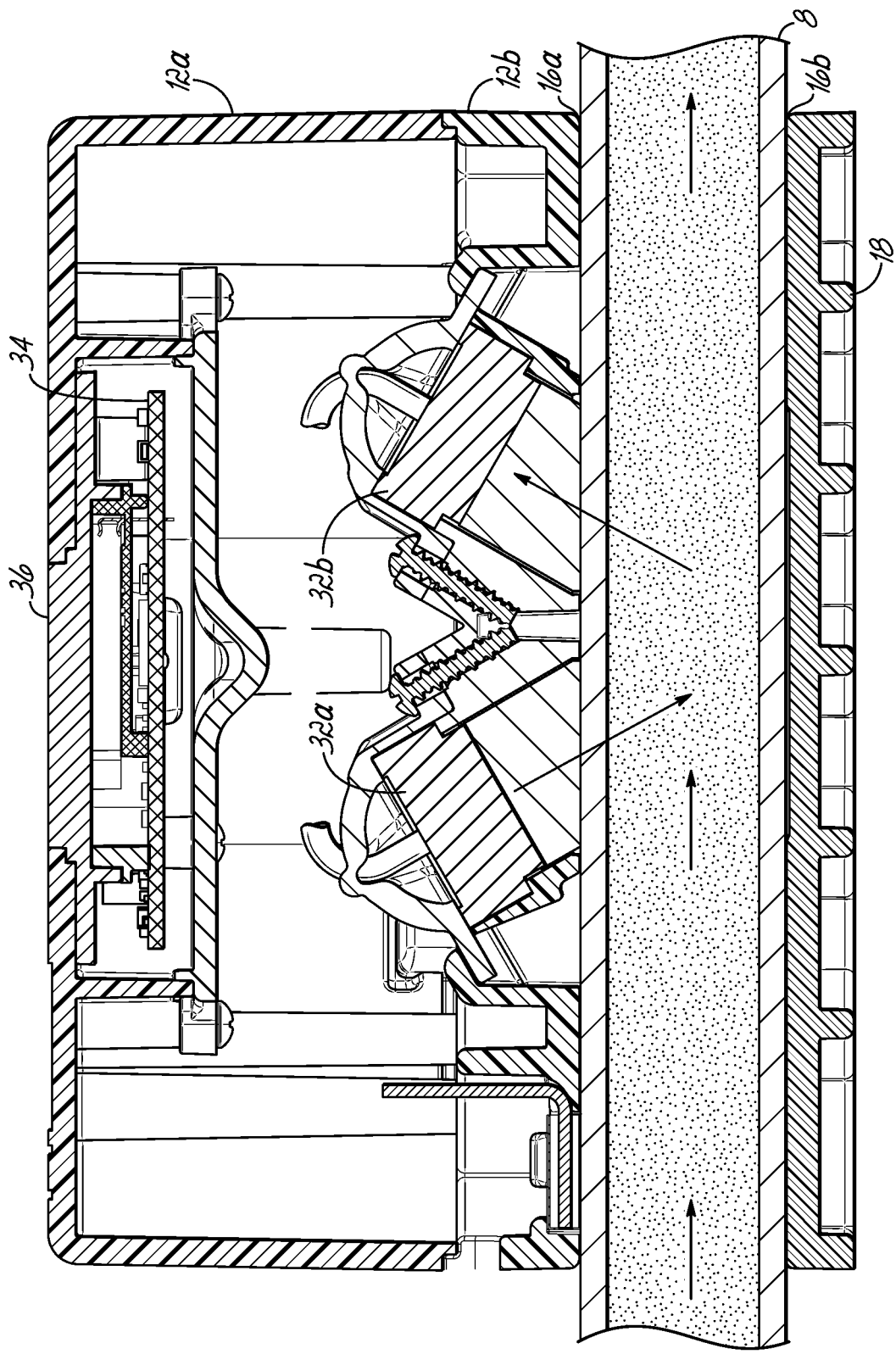
FIG. 3 is a cross sectional view of the clamp on ultrasonic flow meter of FIGS. 1 and 2, taken along lines 3-3 in FIG. 2 and showing the ultrasonic transmitter and receiver and control board within the meter.
Figure 4:
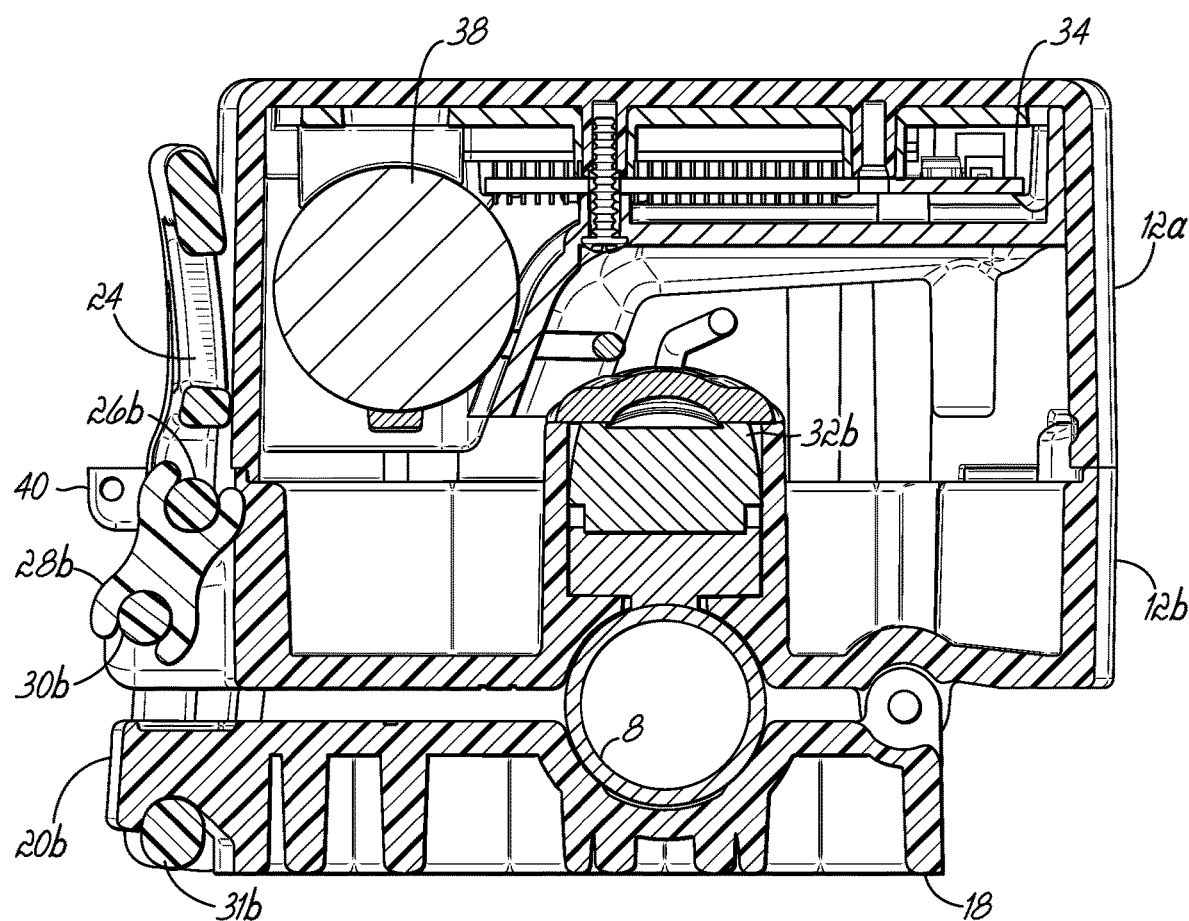
FIG. 4 is a cross sectional view of the clamp on ultrasonic flow meter of FIGS. 1 and 2, taken along lines 4-4 in FIG. 2.

As seen in FIG. 3, in a cross sectional view of the clamp on ultrasonic flow meter of FIGS. 1 and 2, taken along lines 3-3 in FIG. 2, the internal structure of the clamp-on meter is visible. Internal components include an ultrasonic transmitter 32*a* and receiver 32*b*, which are controlled by control board 34 within the meter. Control board 34 presents information on display 36 to be viewed by a user. The electronic components are provided with electrical energy by a battery 38, visible in FIG. 4.

Figure 5C:
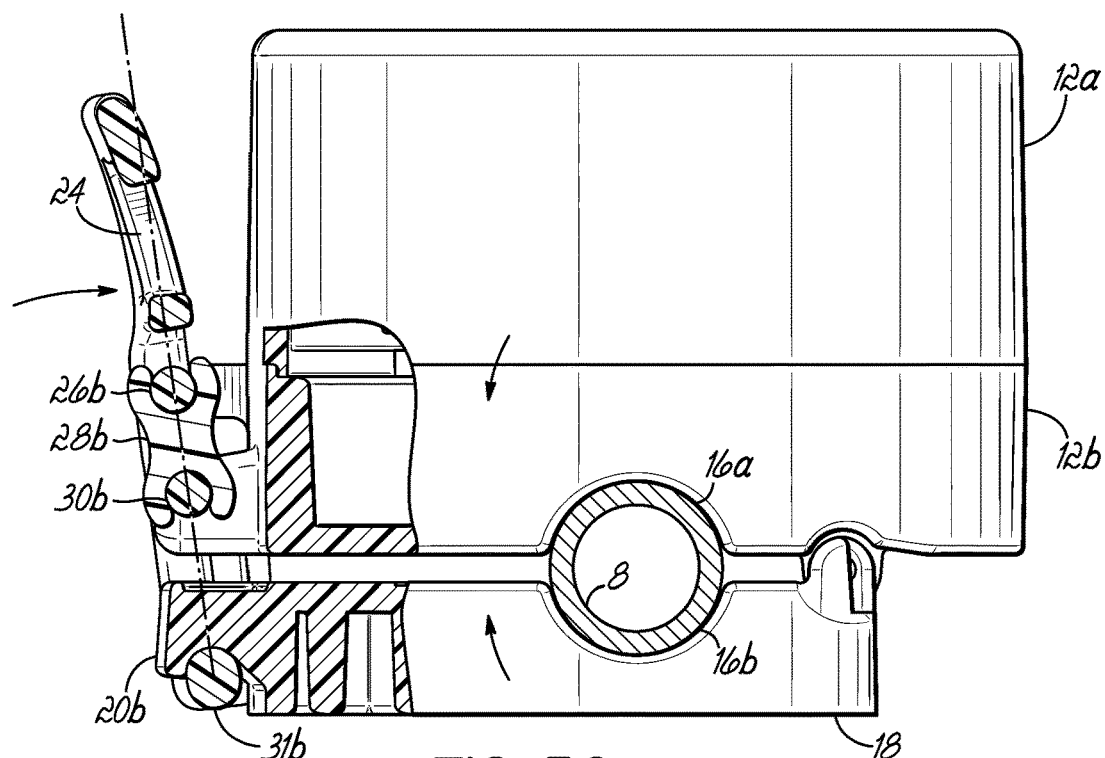
FIG. 5C is a left side view of the clamp on meter in a closed position showing the over-center nature of the closure of the exterior clamp.
Figure 5D:
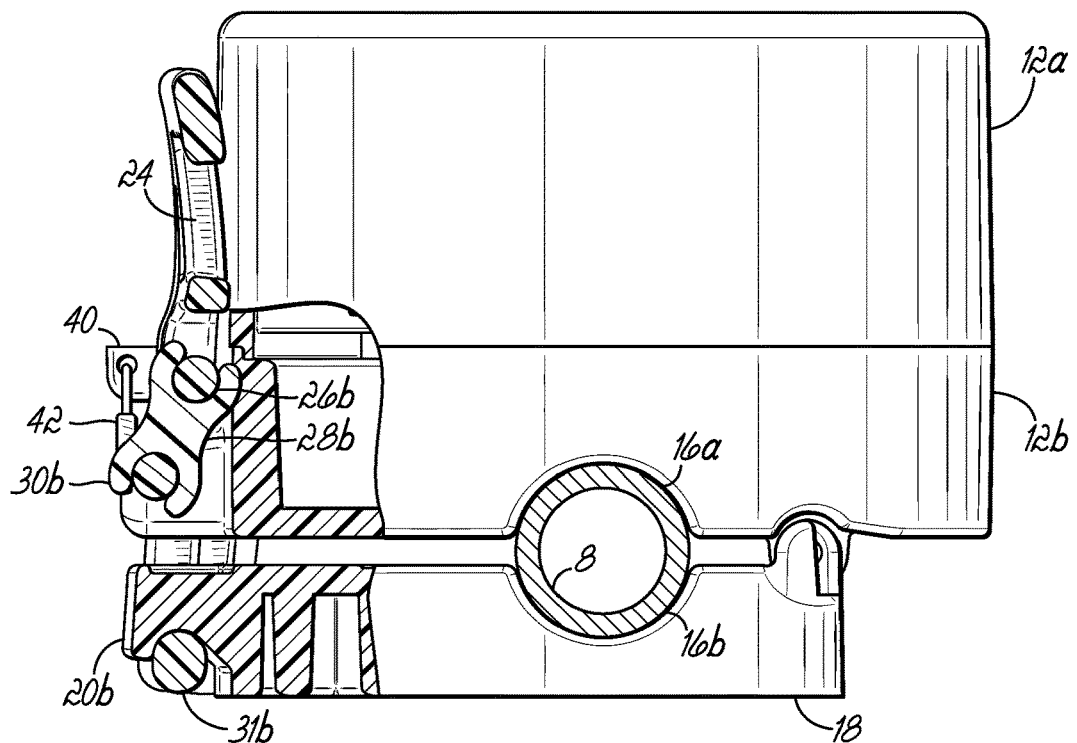
FIG. 5D is a left side view of the clamp on meter in a closed position shown the exterior clamp in its closed position and a security tag installed thereon.

The latch 24 interacts with the remainder of the meter to provide an over-center latching function. As seen in FIG. 5A, which is a left side view of the clamp on meter of FIGS. 1 and 2, the latch may be swung in the direction of the arrows in FIG. 5A to engage latch hooks 31*a* and 31*b* with housing hooks 20*a* and 20*b*. Thereafter, as seen in FIG. 5B, the latch may be rotated in the opposite directions to create force driving the first and section sections of the housing 12 and 18 together around a pipe section 8. As seen in FIG. 5C, the point of maximum pressure occurs when axles 26*a*/26*b* and 30*a*/30*b* are colinear with hooks 31*a*/31*b*. As seen in FIG. 5D, once latch 24 is rotated past this point, the latch 24 comes to rest against housing section 12 and is held there by the engagement force through hinge members 28. In this position shown in FIG. 5D, the clamp on meter in a closed position and a swaged security tag 42 may be installed thereon, as discussed above.

The foregoing description of specific embodiments will so fully reveal the general nature of embodiments of the invention that others can, by applying knowledge of those of ordinary skill in the art, readily modify and/or adapt for various applications such specific embodiments, without undue experimentation, without departing from the general concept of embodiments of the invention. For example, principles of the invention may be implemented using a latch member that is engaged to the meter housing with only one hinge member 28, or with only one pair of hook members 28 and 31. As such, adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the invention should not be limited by any of the above-described example embodiments but should be defined only in accordance with the following claims and their equivalents.

I claim:

1. A clamp-on ultrasonic flow meter, comprising
   a. a housing, the housing comprising first and second housing portions, a hinged coupling between the first and second housing portions, the first and second housing portions defining a recess for receiving a pipe through which flow is to be measured, wherein the first housing portion defines a housing axle and the second housing portion defines a housing hook;
   b. an ultrasonic transmitter positioned within the housing positioned adjacent to said recess for engagement to said pipe placed within said aperture recess;
   c. an ultrasonic receiver positioned within the housing positioned adjacent to said recess for engagement to said pipe placed within said recess;
   d. a hinge having first and second ends, the first and second ends each comprising a bearing, the bearing in the first end of said hinge being coupled to said housing axle,
   e. a latch comprising at least one latch axle and at least one latch hook, the bearing in the second end of said hinge being coupled to said latch axle, the latch hook sized to couple to the housing hook on said second housing portion,
   f. wherein the recess encloses said pipe by closing said first and second housing portions about said pipe, coupling said latch hook to said housing hook and positioning said latch to compress said hinge between said latch axle and said housing axle and thereby provide closing pressure through said latch to compress said first and second housing portions about said pipe.

2. The clamp on ultrasonic flow meter of claim 1 wherein the second housing portion comprises a second housing hook, and the latch comprises a second latch hook, wherein said pipe is engaged within said recess by coupling said second latch hook to said second housing hook and then positioning said latch to compress said hinge between said latch axle and said housing axle.

3. The clamp on ultrasonic flow meter of claim 2 wherein the first housing portion comprises a second housing axle, and the latch comprises a second latch axle, and further comprising a second hinge having first and second ends, the first and second ends each comprising a bearing, the bearing in the first end of said second hinge being coupled to said second housing axle, the bearing in the second end of said second hinge being coupled to said second latch axle, wherein said pipe is engaged within said recess by coupling said latch hook to said housing hook and then positioning said latch to compress said second hinge between said second latch axle and said second housing axle.

4. The clamp on ultrasonic flow meter of claim 1 wherein the first housing portion comprises a second housing axle, and the latch comprises a second latch axle, and further comprising a second hinge having first and second ends, the first and second ends each comprising a bearing, the bearing in the first end of said second hinge being coupled to said second housing axle, the bearing in the second end of said second hinge being coupled to said second latch axle, wherein said pipe is engaged within said recess by coupling said latch hook to said housing hook and then positioning said latch to compress said second hinge between said second latch axle and said second housing axle.

5. A method of clamping an ultrasonic flow meter to a section of pipe, comprising:
   a. providing a flow meter housing comprising first and second housing portions, a hinged coupling between the first and second housing portions, with the first and second housing portions defining recess for receiving a pipe through which flow is to be measured, wherein the first housing portion defines a housing axle and the second housing portion defines a housing hook;
   b. positioning an ultrasonic transmitter within the housing adjacent to said recess for engagement to a pipe placed within said recess;
   c. positioning an ultrasonic receiver within the housing adjacent to said recess for engagement to a pipe placed within said recess;
   d. providing a hinge having first and second ends, the first and second ends each comprising a bearing,
   e. coupling the bearing in the first end of said hinge to said housing axle,
   f. providing a latch comprising at least one latch axle and at least one latch hook, the latch hook sized to couple to the housing hook on said second housing portion,
   g. coupling the bearing in the second end of said hinge to said latch axle,
   h. closing said first and second housing portions about a pipe,
   i. coupling said latch hook to said housing hook, and
   j. positioning said latch to compress said hinge between said latch axle and said housing axle and thereby provide closing pressure through said latch to compress said first and second housing portions about said pipe.

6. The method of claim 5 further wherein the second housing portion comprises a second housing hook, and the latch comprises a second latch hook, and further comprising coupling said second latch hook to said second housing hook before the step of positioning said latch to compress said hinge between said latch axle and said housing axle.

7. The method of claim 6 wherein the first housing portion comprises a second housing axle, and the latch comprises a second latch axle, and further comprising providing a second hinge having first and second ends, the first and second ends each comprising a bearing, and further comprising coupling the bearing in the first end of said second hinge to said second housing axle, coupling the bearing in the second end of said second hinge to said second latch axle, and then engaging a pipe within said aperture recess by coupling said second latch hook to said second housing hook and then positioning said latch to compress said second hinge between said second latch axle and said second housing axle.

8. The method of claim 5 wherein the first housing portion comprises a second housing axle, and the latch comprises a second latch axle, and further comprising providing a second hinge having first and second ends, the first and second ends each comprising a bearing, and further comprising coupling the bearing in the first end of said second hinge to said second housing axle, coupling the bearing in the second end of said second hinge to said second latch axle, and then engaging a pipe within said aperture recess by coupling said latch hook to said housing hook and then positioning said latch to compress said second hinge between said second latch axle and said second housing axle.

* * * * *